US007000187B2

(12) United States Patent
Messinger et al.

(10) Patent No.: US 7,000,187 B2
(45) Date of Patent: Feb. 14, 2006

(54) METHOD AND APPARATUS FOR SOFTWARE TECHNICAL SUPPORT AND TRAINING

(75) Inventors: Frederic P. Messinger, Groton, MA (US); Bruce E. Nevin, Edgartown, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/345,903

(22) Filed: Jul. 1, 1999

(65) Prior Publication Data

US 2002/0154153 A1 Oct. 24, 2002

(51) Int. Cl.
*G06F 3/00* (2006.01)
(52) U.S. Cl. ............... 715/705; 715/808; 715/708; 715/715; 715/709; 715/711; 715/841; 715/842
(58) Field of Classification Search ............... 345/808, 345/708, 715, 705, 709, 711, 841, 842, 854, 345/809, 706, 714
See application file for complete search history.

(56) References Cited

U.S. PATENT DOCUMENTS

| 4,648,062 | A | * | 3/1987 | Johnson et al. ............. 364/900 |
| 5,488,685 | A | * | 1/1996 | Palmer et al. ............... 715/708 |
| 5,602,982 | A | * | 2/1997 | Judd et al. .................. 715/709 |
| 5,764,960 | A | * | 6/1998 | Perks et al. ................. 345/500 |
| 5,781,191 | A | * | 7/1998 | Mayuzumi et al. ......... 345/705 |
| 5,822,123 | A | * | 10/1998 | Davis et al. ................. 348/564 |
| 6,012,075 | A | * | 1/2000 | Fein et al. ................... 707/540 |
| 6,211,874 | B1 | * | 4/2001 | Himmel et al. ............. 345/340 |
| 6,392,670 | B1 | * | 5/2002 | Takeuchi et al. ............ 345/760 |
| 6,582,230 | B1 | * | 6/2003 | Aoshima et al. ............ 715/709 |
| 2002/0118220 | A1 | * | 8/2002 | Lui et al. .................... 345/709 |
| 2002/0168621 | A1 | * | 11/2002 | Cook et al. ................. 434/350 |

\* cited by examiner

*Primary Examiner*—Ba Huynh
*Assistant Examiner*—Mylinh Tran
(74) *Attorney, Agent, or Firm*—Hamilton, Brook, Smith & Reynolds, P.C.

(57) ABSTRACT

Support and training are provided for a user in operating a software application. A list of task indications are coupled to a GUI window. A graphical overlay is positioned on top of the GUI window and coupled to it. A sequence of instructions associated with a respective task is displayed in the graphical overlay upon selection of a task indication by the user. Each instruction directs attention to a respective selectable graphical area in the GUI window. The user operates a selector coupled to the GUI window, where after selecting a task, the selector is used to select graphical areas in response to the sequence of instructions. Recorded voice files or a text-to-speech synthesizer may be coupled to the sequence of instructions, whereby the instruction being displayed is simultaneously presented audibly to the user. A user's selection of one or more selectable graphical areas in a sequence before his or her selection of a task containing that sequence may result in a list of possible tasks being performed being highlighted automatically. The support and training are well suited for operating a computer controlling a system such as a data communication network, where the tasks displayed in the list of task indications are user-privilege specific.

34 Claims, 16 Drawing Sheets

METHOD AND APPARATUS FOR SOFTWARE TECHNICAL SUPPORT AND TRAINING

BACKGROUND OF THE INVENTION

No doubt the continued widespread use of computers by the general public is due at least in part to the development of easy to use graphical user interfaces (GUIs) in operating systems and application software. Indeed, almost all consumer and even new professional quality applications are compliant with either the Microsoft Windows™ or Apple Macintosh OS™ interfaces and their menu driven paradigms.

Despite the widespread belief that such interfaces are easy to use, the complexity of many applications continues to grow. As more features are added to particular software applications, the more likely it is that even a sophisticated user would frequently become uncertain how to proceed. They need information immediately relevant to the next step in their current task. Users turn to printed or online documentation reluctantly and have been observed to ignore such help even when it presents to them the precise answer that they want.

And, while telephone support is another way to obtain assistance, such services are expensive for the vendor and time consuming for the user. As a result, most software vendors rely upon detailed, on-line help files to provide relevant guidance.

One traditional approach to providing on-line guidance is embedded help, where the help information is closely integrated with the graphical user interface (GUI). Extant on-line help systems use a Help menu, context-sensitive help links, and various methods of embedding help links in the GUI. For example, a help link may appear (i) in a menu next to a menu item that opens a dialog box; (ii) as a Help button within the dialog box; (iii) as a tool tip that appears when themouse cursor lingers over an object within the dialog box; or (iv) in a help window alongside the GUI that always displays the help topic for the currently active dialog box. In all these cases, the help text describes aspects of the GUI in a generic way, not specific to the user's current purpose or task.

Another approach is a so-called "Wizard", which prompts the user to select from a list of predefined common tasks. For a selected task, the wizard substitutes a separate so-called "wizard interface" on top of the GUI. The wizard prompts the user for information needed to complete a task then completes the predetermined task "under the hood," in the sense that the user does not see or understand how the task is completed. Another approach is what is referred to as "show me" help, which uses animations to perform tasks for the user. It uses the same GUI, but it still takes control from the user. It is launched from a conventional help topic, so the user must first have accessed the help system.

SUMMARY OF THE INVENTION

The approaches in the prior art tend to restrict a user's maximum learning potential. For example, the embedded help approach opens an external window from the GUI with which the user must interact, thereby causing a loss of attention and disjointed learning. The so-called "wizard" approach tends to take a substantial amount of control away from the user, thereby providing function, but not user learning. The so-called "show me" help approach requires a user to first open a separate window, then takes full control from the user, resulting in the same problems as the wizard approach.

Briefly, the present invention, referred to herein as an "on-line coach", is similar to a wizard to the extent that it permits a user to specify tasks, but the on-line coach does not substitute its own interface. Instead, the on-line coach uses the GUI and guides the user through the individual steps of a task selected from a list of predefined tasks. Therefore, the on-line coach can be used to train a user in learning a computer application to accomplish the ends for which it was purchased and can provide technical support to a user through stages of experience from novice to expert. It can enable expert users to off-load complex tasks to less experienced operators, which otherwise the expert users would have to perform. The on-line coach is tightly coupled to the GUI; it is how the GUI works, rather than being ancillary to the GUI.

In one embodiment, the present invention is an apparatus for providing technical support to and training a user in operating a software application. The apparatus comprises a graphical user interface window through which a plurality of tasks are accomplished, where the window includes a plurality of selectable graphical information input/output areas. A list of task indications are coupled to the GUI window, where each task has an associated task indication. A graphical overlay is coupled to the GUI window, where the overlay is positioned on top of the GUI window. Each task indication is associated with a sequence of instructions which are displayed in the graphical overlay. Each instruction directs attention to a respective selectable graphical area. A selector is coupled to the window, where after selecting a task, the selector is used to select graphical areas in response to the sequence of instructions. A user operating the selector learns a sequence of operations associated with a task through actively interfacing with the GUI window.

The list of task indications dynamically changes as a function of the selectable graphical areas being displayed in the GUI window. The list of task indications is capable of being positioned apart from the GUI window(s) with which the task indications are coupled. The particular tasks displayed in the list of task indications may be presented to the user as a function of a mode setting. The mode setting allows the user to select from among a beginner, intermediate, and advanced mode settings. Also, the tasks displayed in the list of task indications may be user-privilege specific, such as may be provided by using a password to restrict the list of task indications to a subset of selectable task indications.

Once a task is selected, the list of task indications may be replaced by a list of task step indications. Each such task step indication is coupled to a respective sequence instruction, where the associated task step indication is highlighted in sequence with a respective instruction being displayed. In addition, the selection of one or more selectable graphical areas in a sequence before selecting a task causes a subset of tasks in the task list to be automatically highlighted to indicate a guess as to which task the user currently intends to complete. Recorded voice files or a text-to-speech synthesizer may also be coupled to the sequence of instructions so that the instruction being displayed is simultaneously presented audibly to the user.

In the preferred embodiment, the graphical overlay is invisible other than the instruction being displayed. The instruction being displayed in the graphical overlay includes an information box including at least one of: recommended input, required input, example input, sub-sequence list, and a "what-to-expect" next descriptor.

Another aspect of the present invention relates to a method for software technical support and training operating in a computer system. The method includes providing a graphical user interface window through which a plurality of tasks are accomplished, where the GUI window has a plurality of selectable graphical areas. The method includes displaying a list of task indications coupled to the GUI window, where each task has an associated task indication. The method also includes forming a graphical overlay coupled to the window, where the graphical overlay is positioned on top of the GUI window. For each task indication, the method includes displaying a sequence of instructions in the graphical overlay, where each instruction directs attention to a respective selectable graphical area in the GUI window. The method further includes providing a selector coupled to the window, where after selecting a task, the selector selects selectable graphical areas in response to the sequence of instructions. The user operating the selector thus learns a sequence associated with a task through actively interfacing with the GUI window.

In one embodiment, the step of displaying task indications includes a step of dynamically changing the list of task indications as a function of the selectable graphical areas being displayed in the GUI window. In another embodiment, the step of displaying task indications includes presenting the list of task indications external from the GUI window while still presenting the sequence of instructions in the graphical overlay. This step may also include modifying the list of task indications as a function of a mode setting, where the mode setting is a beginner, intermediate, or advanced mode setting.

In another embodiment, the computer on which the method operates controls an external system; for instance, a data communication network. In this instance, the step of displaying task indications includes a step of modifying the list of task indications as a function of the user's network privileges. This step is preferably implemented by restricting the display of tasks by a password privilege.

The step of displaying task indications may optionally include replacing the task list with an expansion of the selected task into a list of subtasks, where each task step indication is coupled to a respective sequence instruction. Each respective task step indication is also highlighted in sequence with the corresponding sequencer instruction.

In yet another embodiment, the step of forming a graphical overlay optionally includes configuring the graphical overlay to allow the selectable graphical areas in the graphical user interface window to be displayed without obstruction. Furthermore, the step of displaying a sequence of instructions may optionally include displaying an information box, including displaying in the box at least one of: recommended input, required input, example input, subsequence list, and a description of what to expect next.

The method may further comprise converting the sequence of instructions to an audio output through recorded voice files or a text-to-speech synthesizer coupled to the sequence of instructions. This permits the instruction being displayed to simultaneously be presented audibly.

In addition, selecting one or more selectable graphical areas in a sequence before selecting a task optionally includes automatically highlighting a list of possible tasks being performed.

BRIEF DESCRIPTION OF THE DRAWINGS

The above and other features of the invention, including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principals and features of this invention may be employed in various and numerous embodiments without departing from the scope of the invention. In the drawings, like reference characters refer to the same parts throughout the different views.

DETAILED DESCRIPTION OF A PREFERRED EMBODIMENT

Figure 1:
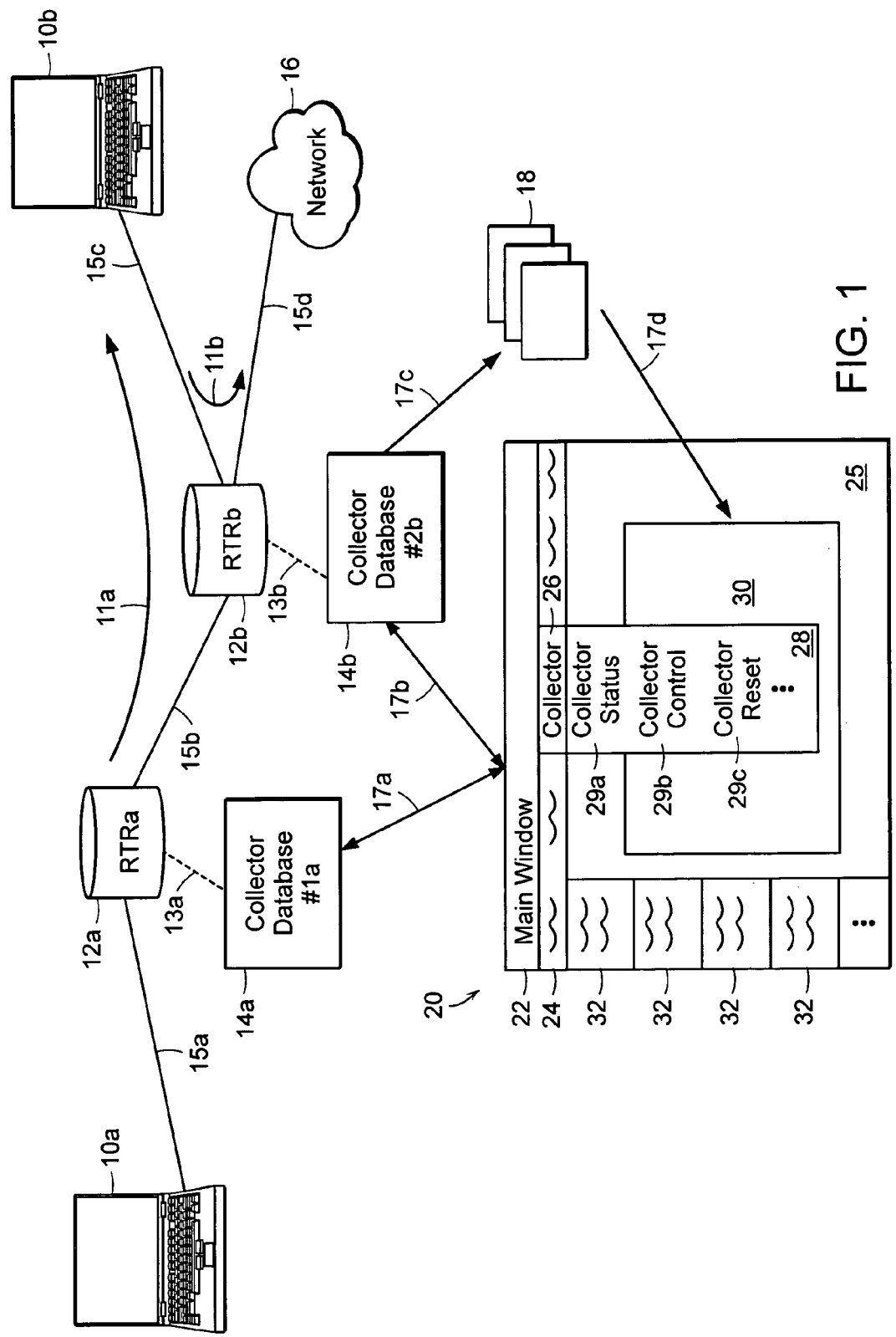
FIG. 1 is a block diagram of an application program environment in which the present invention is deployed; an embodiment of the present invention being represented in a top level screen view 20.

FIG. 1 is a block diagram of an application in which the present invention is deployed. A user interfaces with a GUI (Graphical User Interface) 20 to control certain aspects of and glean certain information from internetworking devices, such as a router 12a and router 12b, hereafter referred to as rtra 12a and rtrb 12b, respectively. In this example, the GUI 20 communicates with a first collector database 14a and a second collector database 14b, which interface with router management software controlling the routers 12a, 12b. The router management software captures operator-specified information, such as data packets or control information associated therewith, transmitted and received by rtra 12a and rtrb 12b, respectively, and stores the captured information in the collector databases 14a, 14b, respectively. Collector database 14a, 14b to router 12a, 12b coupling is indicated by a pair of dashed lines 13a, 13b.

A portion of data stored in the first collector database 14a and the second collector database 14b is information transmitted from a first computer 10a to a second computer 10b. The first computer 10a communicates to rtra 12a across communication link 15a. The second computer 10b is connected to rtrb 12b via communication link 15c. Rtra 12a is connected to rtrb 12b via communication data link 15b. Data flow from the first computer 10a to the second computer 10b is indicated by a data transmission indicator 11a.

Further connected in the example application is a network 16. The network 16 is connected to rtrb via communication link 15d. The first collector database 14a and the second collector database 14b also capture other information, such as information flowing from the second computer 10b to the network 16 across communication links 15c and 15d, as indicated by a data transmission indicator 11b.

Referring again to the GUI 20, the application comprising the GUI 20 (with which the present invention is coupled) is linked to the first collector database 14a via communication link 17a and the second collector database 14b via communication link 17b. The second collector database 14b is composed of database information 18, which flows back to the GUI 20 via communication links 17c and 17d.

The GUI 20 comprises a title bar 22, a menu item command bar 24, and a main display area 25. These aspects of the GUI 20 are typical in a graphical user interface. Another typical graphical user interface structure is an information display 30 in the main display area 25, in this case comprising collector database #2 14b information database 18.

Examples of display information specifically embodied by the present invention are graphical areas 32, menu bar item 26, and pull down menu items, 29a, 29b, 29c, collectively 28. In the internetwork device application example being described, the pull down menu items 28 include a collector status item 29a, a collector control item 29b, and a collector reset item 29c. An I/O device, coupled to a computer (and hence the GUI window 40) on which the present invention operates, is used to select one of several dropdown menu items 28. Typical I/O devices used for selecting a dropdown menu items 28 may include a computer mouse, a keyboard, a touch screen, a voice recognition system, etc.

Figure 2:
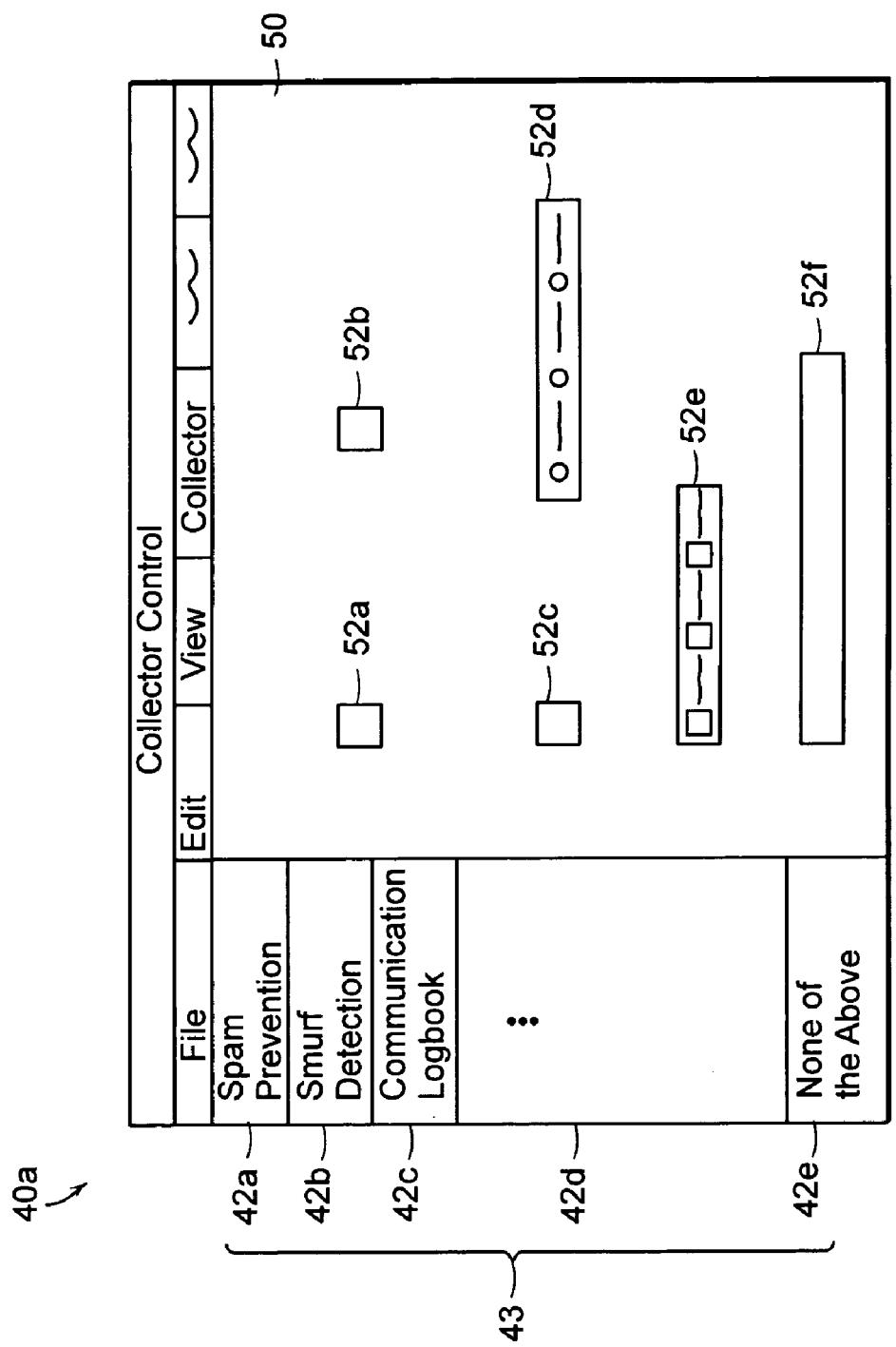
FIG. 2 is an intermediate screen view 40a associated with the top level screen view 20 discussed in FIG. 1.

FIG. 2 illustrates an exemplary display which is shown when the user selects a GUI window 40a resulting from selecting (through use of an I/O device) the collector control item 29b from the pull down menu items 28 in FIG. 1. An example collector control application of FIG. 2 permits the user to access information stored in the collector databases 14a, 14b in FIG. 1. The collector control application has various control interfaces in the form of graphical buttons and fill-in boxes used for command and control of the collector database 14a, 14b. These command interfaces, such as 52a, 52b, 52c, 52d, 52e, 52f (collectively 52) are shown in the main display area 50. Further shown in the GUI window 40a are a series of graphical areas, also referred to as a task list 43, which are selectable by the I/O device. The task list 43 includes: a spam prevention task button 42a, a smurf detection task button 42b, a communication log book task button 42c, a plurality of unspecified tasks buttons 42d, and a "none of the above" task button 42e, collectively the buttons 42.

Functionally, selecting a task button 42 instantiates a GUI coach in a form of graphical representations in the main display 50. In the preferred embodiment, performing an action command (i.e., selecting a command interface 52 in the main display area 50) triggers a so-called "guess" by the present invention to determine which task 42 from the task list 43 the user is attempting to execute. Selecting a task and bypassing a task selection are principles of the present invention further discussed below in a FIG. 5 discussion.

Figure 3A:
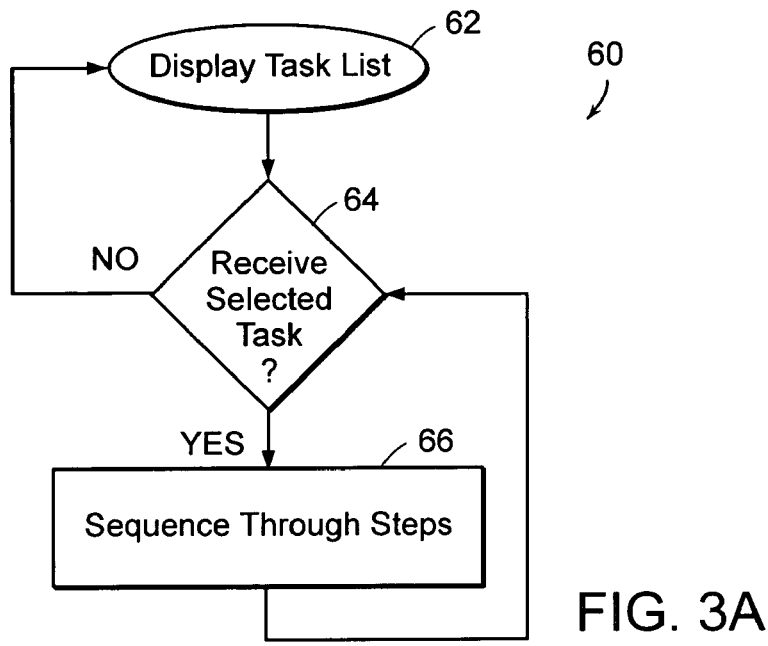
FIG. 3A is a generalized block diagram of an embodiment underlying the example discussed in FIGS. 1 and 2.
Figure 5:
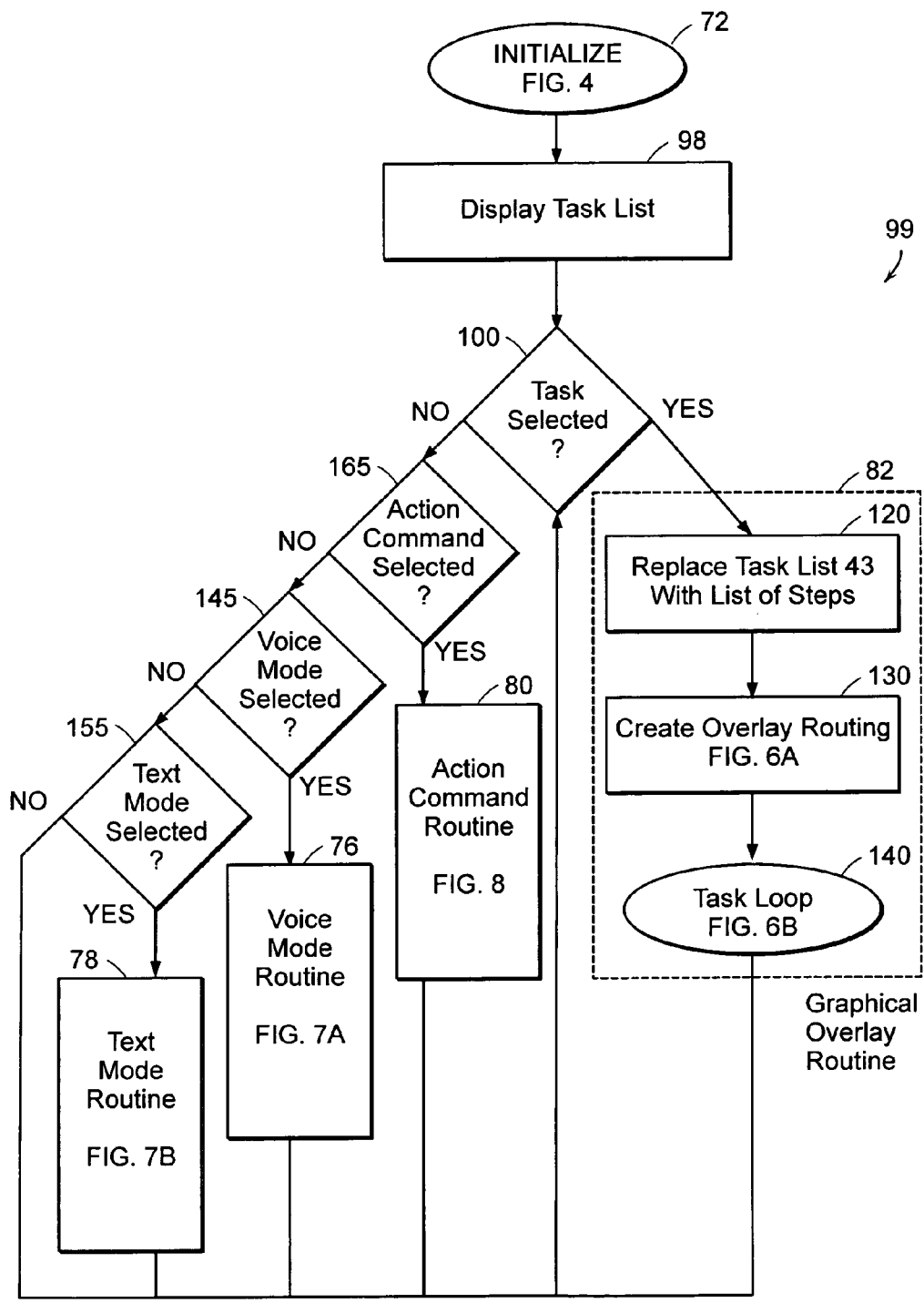
FIG. 5 is a flow diagram of the method of FIG. 3A.

FIG. 3A is a generalized, high-level, flow diagram of an embodiment of a process 60 capable of being employed in the example discussed in FIGS. 1 and 2. The process 60 begins by displaying a task list 62. A receive selected task query 64 determines whether a selected task request has been received. If a selected task has not been received, the process 60 loops back to the step of displaying the task list 62. If a selected task request has been received, the process 60 proceeds to step 66, which sequences through a set of selected task steps, in response to a user selection task, as determined by the receive selected task query 64. FIG. 5 and other Figs. referenced therein provide detail for FIG. 3A.

Figure 3B:
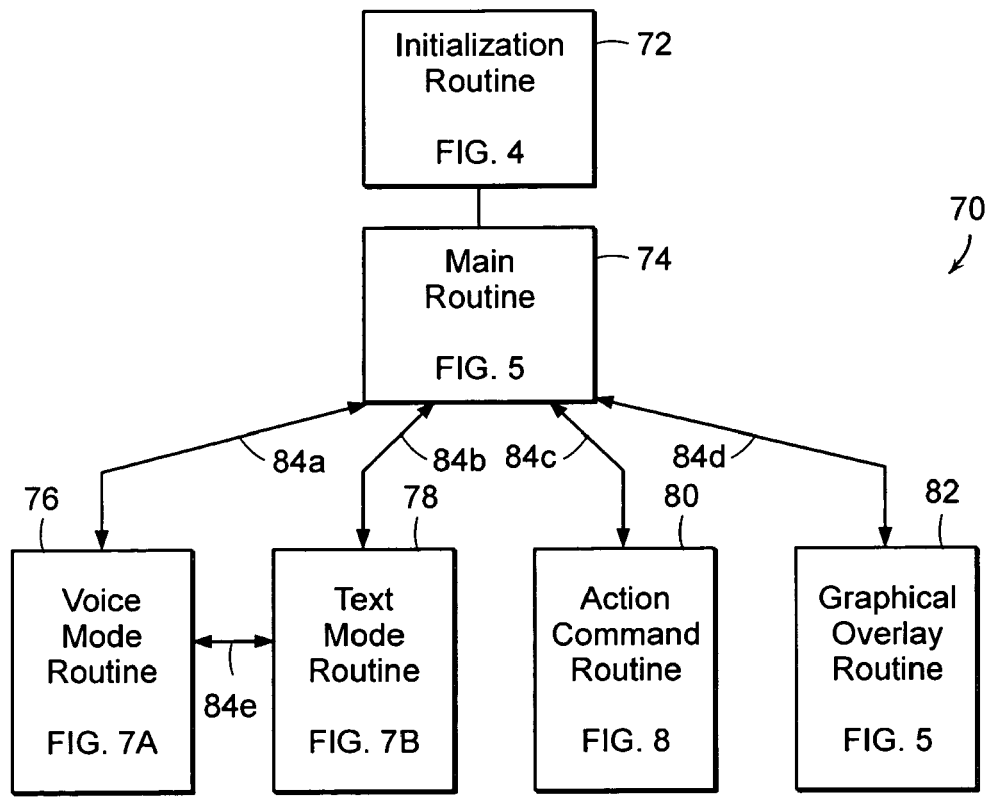
FIG. 3B is a generalized block diagram of an apparatus related to FIG. 3A.

FIG. 3B is a generalized block diagram 70 of an apparatus that corresponds to the generalized flow diagram of the process 60 discussed and illustrated in FIG. 3A. After completing an initialization routine 72, a main routine 74 is used to handle user interaction and to control information flow to and from various lower level routines.

A voice mode routine 76 is linked to the main routine 74 via a data link 84a. The data link 84a and other data links described herein are generally understood to be computer program constructs used for passing information between routines 74 and 76 such as through the use of variables, parameters, data objects, data structures, and computer memory locations, for example. The voice mode routine 76 is used to create audio output for the user, if audio output is desired and selected.

A text mode routine 78 is linked to the main routine 74 via data link 84b. The text mode routine 78 and the voice mode routine 76 are coupled together by a data link 84e. One reason for directly coupling routines 76 and 78 is due to their inter-relatedness in terms of user interaction in providing an aspect of the "coach" functionality for the user, as discussed in greater detail below in connection with FIG. 7B.

An action command routine 80 is linked to the main routine 74 via data link 84c. The data link 84c is implemented in the manner discussed above for data links 84a and 84b. The action command routine 80 is employed in an event the user begins performing an action rather than selecting a task, as discussed above in FIG. 2 and below in FIG. 5.

A graphical overlay routine 82 is linked to the main routine 74 via data link 84d. The graphical overlay routine 82 provides a processing means for displaying a plurality of visual aids as the user is "coached" through a selected task, as will be further discussed and demonstrated in FIGS. 9–12.

Figure 4:
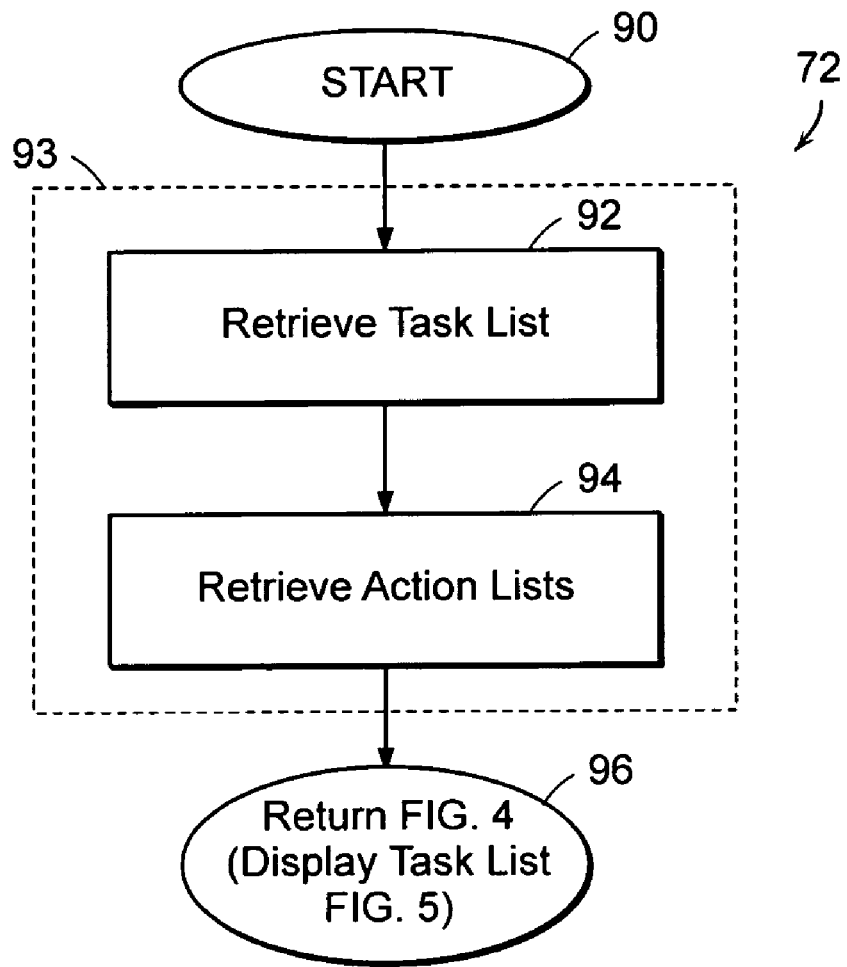
FIG. 4 is a generalized flow diagram of an initialization sequence in the initialization routine 72 of FIG. 3B.

FIG. 4 is a generalized flow diagram for the initialization routine 72 (FIG. 3B). After starting in step 90, the initialization routine 72 retrieves a task list in step 92. Action lists associated with respective task lists are retrieved in step 94. The initialization routine 72 exits/returns in step 96 to begin the main routine 74 (FIG. 3B). In an alternate embodiment, steps 92 and 94 are combined in a single step 93 to retrieve task and action lists.

FIG. 5 is a more detailed flow diagram of the process shown in FIG. 3A. The process 99 begins by an initialization sequence in the initialization routine 72 (FIG. 4). After completion of the initialization routine 72, a task list is displayed in step 98, followed by task selected query 100, which is a central point for enabling user interaction.

If the task selected query 100 is answered "yes", the graphical overlay routine 82 is employed. In the graphical overlay routine 82, the task list 43 (FIG. 2) is replaced with a list of corresponding underlying steps in step 120. A create overlay routine 130 (FIG. 6A) is employed to enable graphical overlays on the GUI (e.g., GUI 40a, FIG. 2) with which the present invention is coupled. Then, a task loop 140 (FIG. 6B) receives control, "coaching" the user through the selected task steps. Upon completion of the graphical overlay routine 82, the flow diagram 99 returns back to the task selected query 100 for further user interaction.

If the answer to the task selected query 100 is "no", an action command selected query 165 is performed. If the action command selected query 165 is answered "yes", the action command routine 80 is employed. After performing the action command routine 80, the task selected query 100 is used to provide continued user interaction.

If the action command selected query 165 is answered "no", a voice mode selected query 145 is performed. If the voice mode selected query 145 is answered "yes", the voice mode routine 76 (FIG. 3B and further discussed in FIG. 7A) is employed. After the voice mode routine 76 is finished, the task selected query 100 once again provides support for user interaction.

If the voice mode selected query 145 is answered "no", a text mode selected query 155 is performed. If the text mode selected query 155 is answered "yes", the text mode routine 78 (FIG. 3B and further discussed in FIG. 7B) is employed. After completing the text mode routine 78, the task selected query 100 once again provides support for user interaction. In the embodiment depicted, if the text mode selected query 155 is answered "no", the task selected query 100 is performed. In alternate embodiments, further queries and corresponding routines are included in the process of FIG. 5.

Figure 6A:
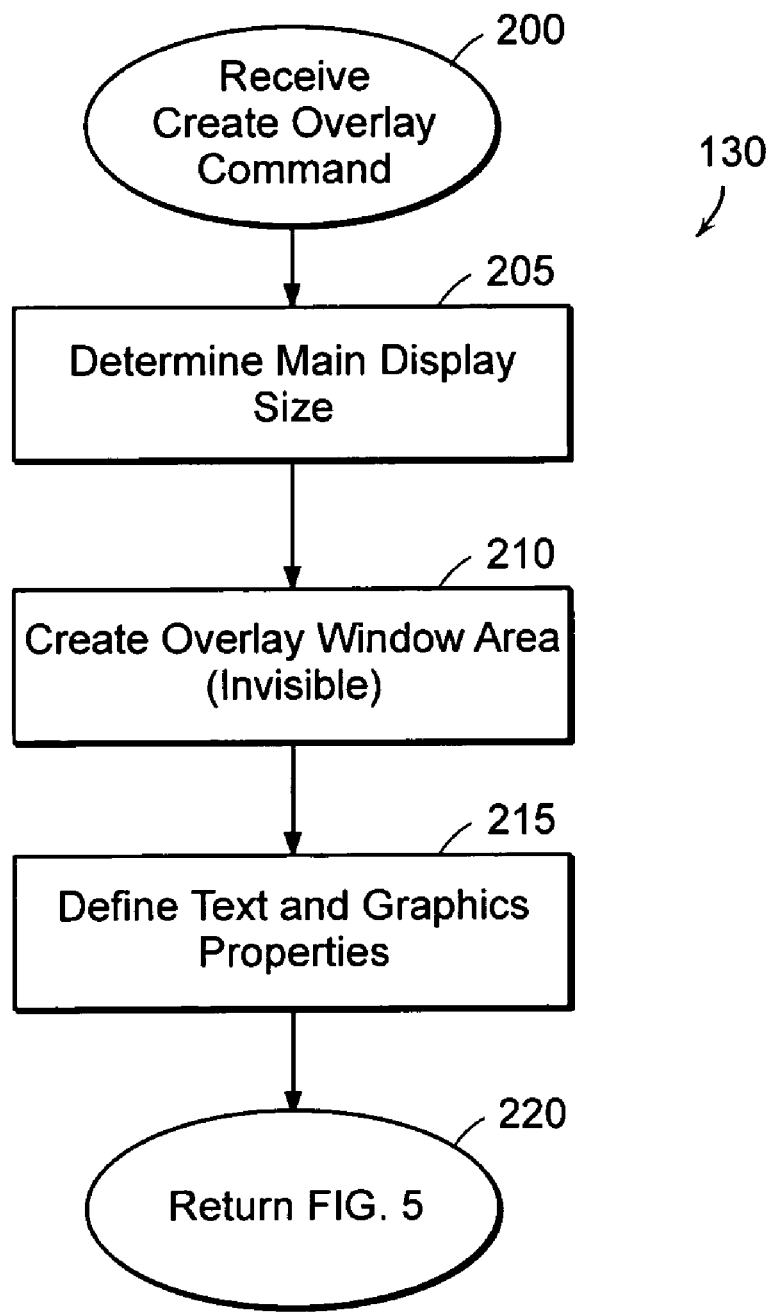
FIG. 6A is a flow diagram of the underlying steps for a create overlay routine 130 of FIG. 5.

FIG. 6A is an embodiment of the create overlay routine 130 of FIG. 5. The process for the create overlay routine 130 begins after receiving a create overlay command in step 200. Then, the main display 50 (FIG. 2) size is determined in step 205. An overlay window area is created in step 210. In the preferred embodiment, the overlay window area is invisible, displaying only relevant graphics for "coaching" the user through a sequence of steps. Text and graphics properties are defined in step 215, where the text and graphics are those to be displayed in the overlay window. Examples of text and graphics properties are translucency, color, size, etc. Finally, a return in step 220 occurs, exiting the create overlay routine 130 and returning back to FIG. 5 to enter the task loop 140 (FIG. 5).

Figure 6B:
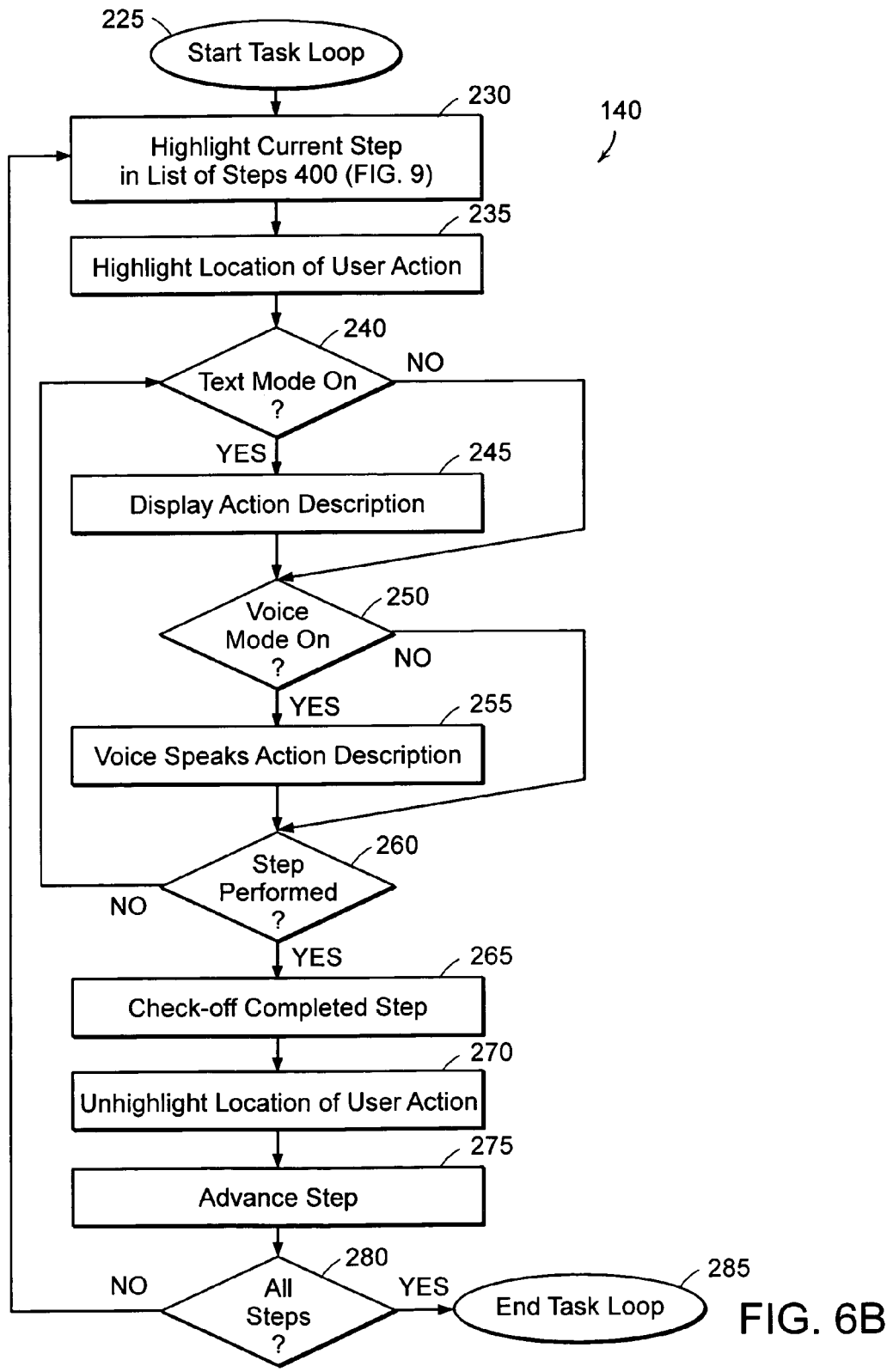
FIG. 6B is a flow diagram of a task loop 140 of FIG. 5.

FIG. 6B illustrates a flow diagram of the task loop 140 (FIG. 5). The task loop 140 begins by starting the task loop in step 225, thereafter entering a larger loop until all steps are complete, as determined by the all steps complete query 280.

A current step in a list of steps 400 (FIG. 9) is highlighted in step 230. FIGS. 9–12 contain more detail on how the list of steps 400 is highlighted.

The location of the user action is highlighted in step 235. Highlighting the location of the user action is done in one of two ways: (i) highlighting the location of the user action in the main display area 50 (FIG. 2), or (ii) having a graphical representation indicate the location of the user action, where the graphical representation is put in the graphical overlay on top of the main display area 50. Highlighting the location of the user action in step 235 is intended to "coach" the user through a series of steps, which is intended to teach the user the series of steps associated with a task.

A "text mode on" query is made in step 240. If the "text mode on" query 240 is answered "yes", a description describing a next expected/required action is displayed in step 245. Such description is graphical or textual in the preferred embodiment, depending upon which description format best describes the recommended action in the series of steps. If the "text mode on" query 240 is answered "no", step 245 is bypassed, and a "voice mode on" query 250 is performed.

The "voice mode on" query 250 determines whether or not to have an action description "voiced" by the computer to the user. If the "voice mode on" query is answered "yes", a computer-generated voice speaks the action description in step 255. In one embodiment, the action description is text, which is then "voiced" to the user graphic. In another embodiment, the action description is graphical, which is then "voiced" to the user with text indicating the action description graphic. If the "voice mode on" query 250 is answered "no", the voice speaking the action description in step 255 is bypassed, and a "step performed" query in step 260 is performed.

Figure 9:
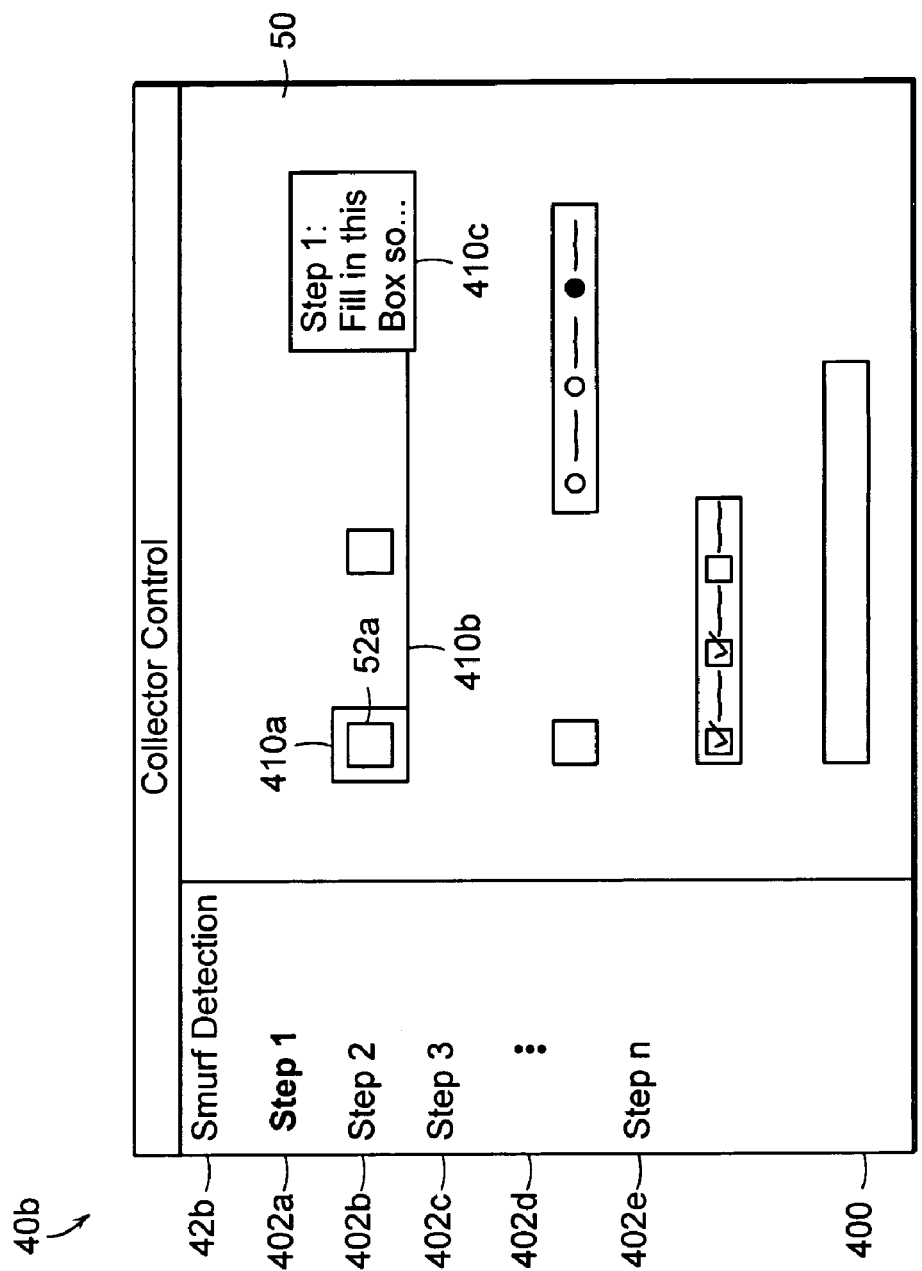
FIG. 9 is an example first screen view 40b having a sequence first step in a smurf detection task 42b sequence, selected from the task list 43 of FIG. 2.

If the current step has not been performed, as determined by the "step performed" query in step 260, the flow diagram loops back to the "text mode on" query 240. In this case, steps 245, 250 and 255 are repeated, but slowed using a reasonable delay time, such as 30 seconds, so as not to constantly audibly communicate action descriptions to the user, which tends to disrupt the user's train of thought. If the "step performed" query 260 is answered "yes", the user has completed a particular step in the list of steps 400 (FIG. 9).

After the current task step is completed, the completed step, for example "step 1" 402a (FIG. 9) in the list of steps 400 (FIG. 9), is checked off in step 265. The term "check-off" is indicated by a literal "check mark", text style change, text color change, or other suitable visual representation.

The location of the user action is unhighlighted in step 270. In one embodiment, the GUI area, for example 52a (FIG. 9), is unhighlighted. In another embodiment, the graphical representation, for example the graphical box 410a (FIG. 9) surrounding the GUI graphical area 52a, is removed. Next, an "advance step" action is performed in step 275. For example, advancing from "step 1" 402a (FIG. 9) to "step 2" 402b (FIG. 10) results from an advance step action in step 275. Advancing the task step in step 275 results in the command input box highlighted in the main display area 50 (FIG. 9) to be advanced as well, as described above.

If all steps have been completed, as determined by the "all steps complete" query 280, the task loop 140 returns to the task selected query 100 (FIG. 5). If the "all steps complete" query 280 is answered "no", control returns to the "highlight current step in list of steps 400 (FIG. 9)" in step 230. The task loop 140 continues until all steps in the task are completed by the user. Again, visually stepping a user through a list of steps 400 (FIG. 9) in a particular task, and optionally describing each step audibly, is intended to "coach" the user through the selected task, thereby supporting and training the user in using the application program through the GUI 40a (FIG. 2) interface.

Figure 7A:
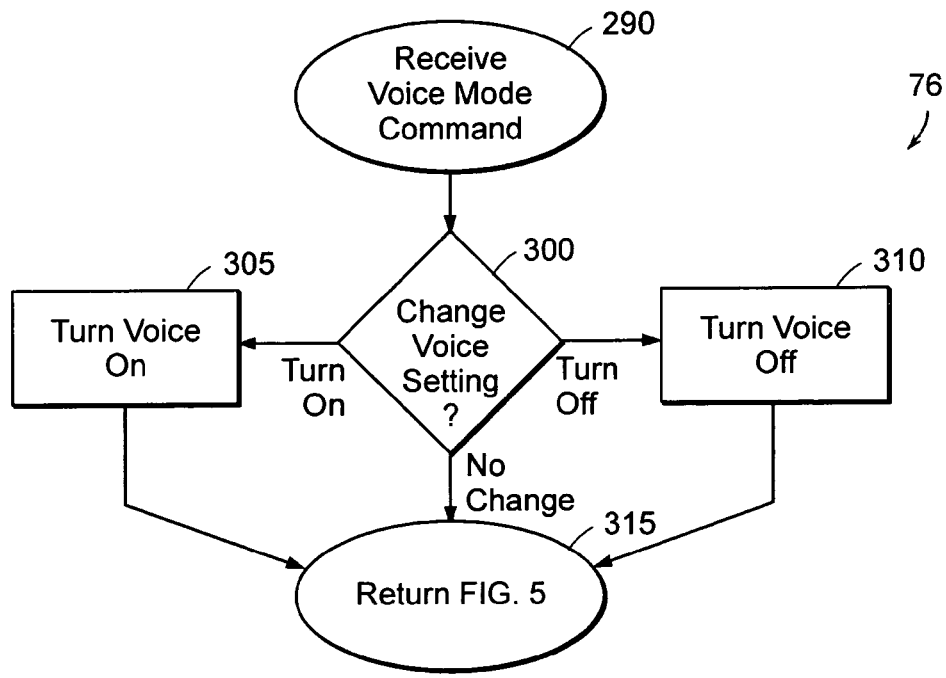
FIG. 7A is a flow diagram of a voice mode routine 76 of FIG. 5.

FIG. 7A is a flow diagram of the voice mode routine 150 of FIG. 5. After receiving a voice mode command in step 290, a change voice setting query 300 is performed. If the "change voice setting" query 300 determines the user has elected to "turn on" the voice mode, a "turn voice on" action 305 occurs. If the "change voice setting" query 300 determines a "turn off" decision has been made by the user, a "turn voice off" action 310 occurs. If the "change voice setting" query in step 300 determines the user has elected no change from the previous setting (e.g., a "turn on" election when the voice mode is already on), a return 315 to the "task selected" query 100 in FIG. 5 occurs.

Figure 7B:
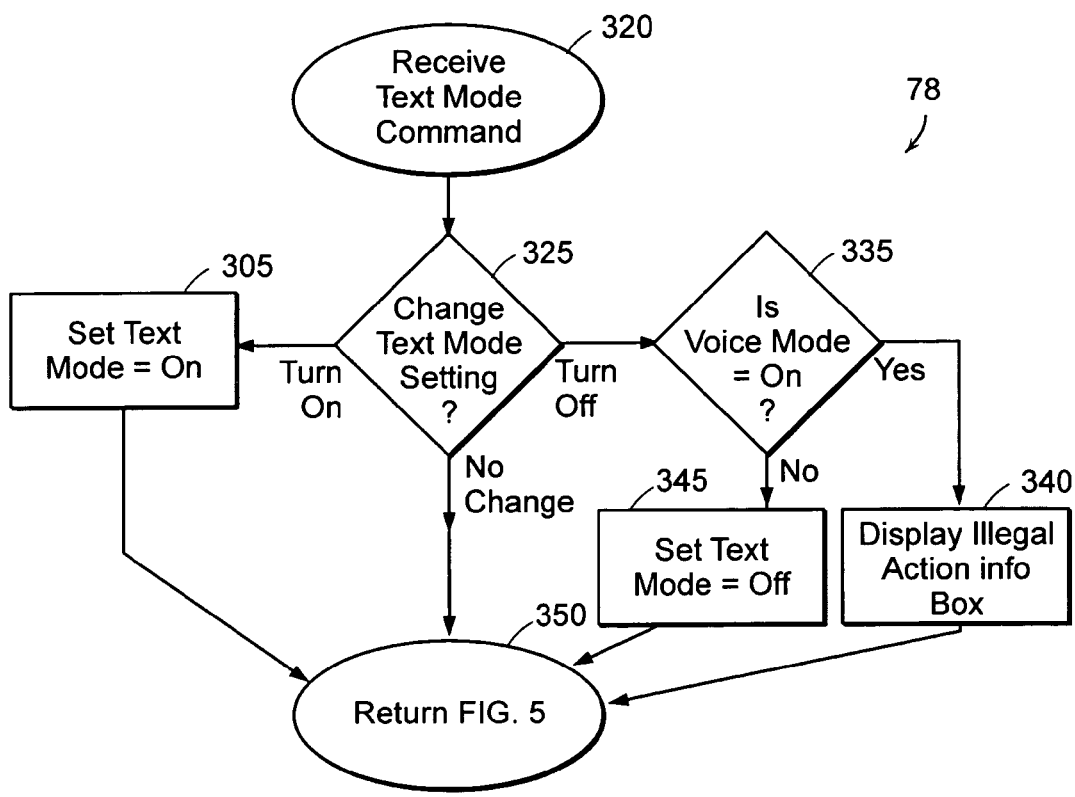
FIG. 7B is a flow diagram of a text mode routine 78 of FIG. 5.

FIG. 7B is a flow diagram of the text mode routine 78 of FIG. 5. After receiving a text mode command in step 320, a "change text mode setting" query 325 is performed. Like the voice mode routine 76 (FIG. 7A), a "turn on", "no change", or "turn off" determination is made by the mode setting query 325.

If the "change text mode setting" query 325 determines a "turn on" decision has been made by the user, a "set text mode=on" action in step 330 occurs before returning 350 from the text mode routine 78. If the "change text mode setting" query 325 determines a "no change", as discussed in FIG. 7A, a return 350 from the text mode routine 78 occurs. If the "change text mode setting" query 325 determines the user has elected "turn off" the text mode, a "voice mode on" query 335 is performed.

The "voice mode on" query 335 determines whether the voice mode is on. If the voice mode is on, the user is not allowed to turn off the text mode. In response, an illegal action info box is displayed in step 340 to inform the user that voice and text are to be displayed together in the preferred embodiment of the present invention. If the "voice mode on" query is determined to be "no", then the text mode is set to an "off" condition in step 345. Finally, the return 350 from the text mode routine 78 occurs, returning control back to the task selected query 100 in FIG. 5.

Referring again to FIG. 5, in the event a user bypasses selecting a task 42*a* . . . *e* (FIG. 2) and goes directly to performing an action, as determined by interfacing with a graphical area 52*a* . . . *f* (FIG. 2), the action command routine 80 is performed.

Figure 8:
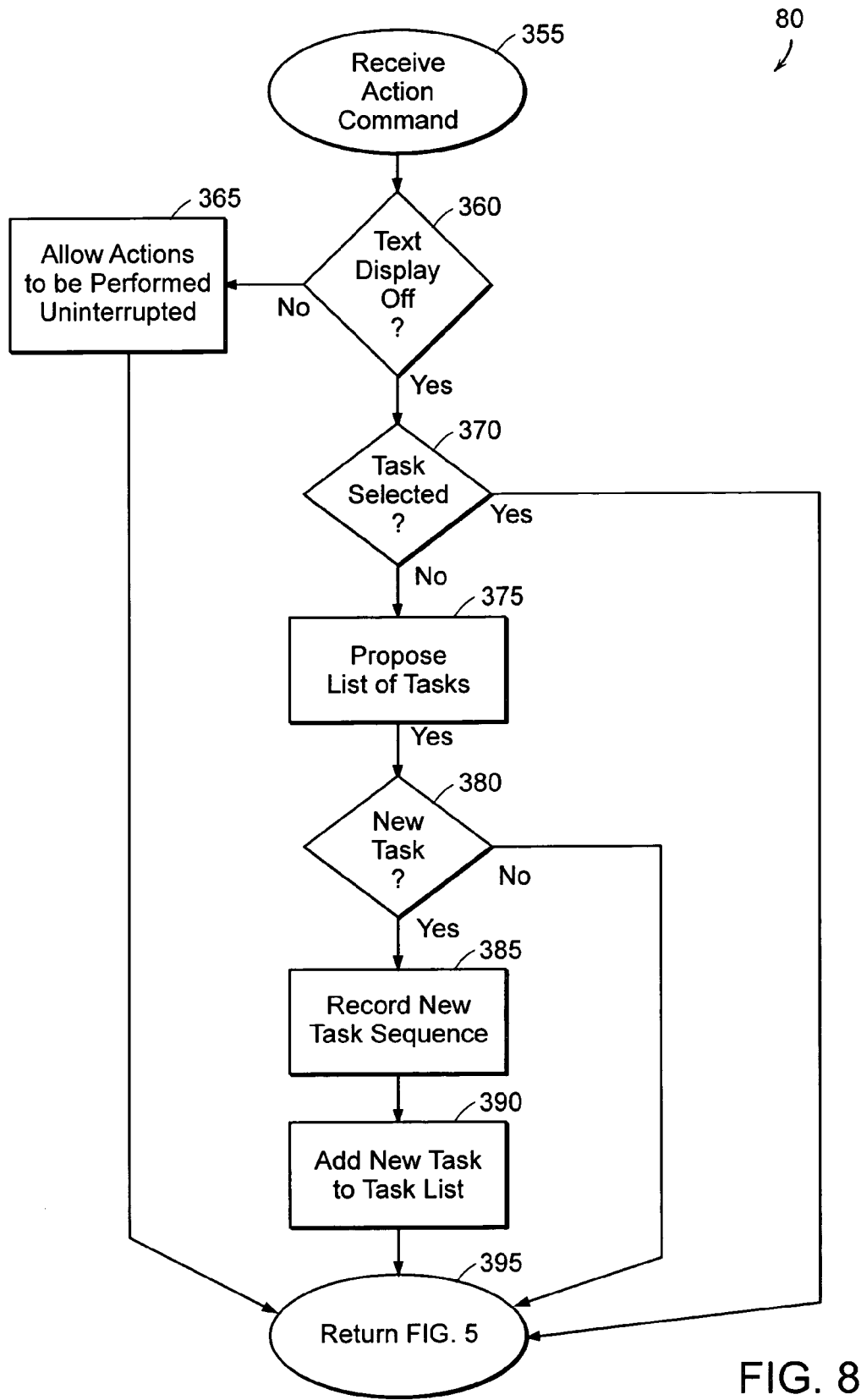
FIG. 8 is a flow diagram of an action command routine 80 of FIG. 5.

FIG. 8 is the preferred embodiment of the action command routine. After receiving the action command in step 355, a "text display off" query 360 determines whether the user wishes to be "coached" through one of several pre-defined possible tasks 43 (FIG. 2). If the "text display mode" query is answered "no", the user is allowed to perform actions uninterrupted in step 365. Upon completion of all tasks, a return from the action command routine 80 occurs in step 395, thereby returning to the "task selected" query 100 of FIG. 5 for continued user interaction/coaching.

If the "text display off" query 360 is answered "yes", a "task selected" query 370 occurs. If the "task selected" query 370 is answered "yes", the action command routine 80 is exited in the return step 395.

If the "task selected" query 370 is answered "no" (i.e., no task item 42*a* . . . *e* in the task list 43 of FIG. 2 has been selected), a list of tasks 375 corresponding to the list of possible tasks 43 for the GUI window 40*a* (FIG. 2) is displayed.

A "new task" query 380 is used to determine if the selected task is in the task list 43 (FIG. 2). If the "new task" query is answered "no", the action command routine 80 returns to the task selected query 100 (FIG. 5) in step 395. If the "new task" query 380 is answered "yes", a new task sequence is recorded in step 385. The new task sequence is added to the task list 43 (FIG. 2) in step 390, which is followed by the action command routine 80, returning control in step 395 to the task selected query 100 in FIG. 5.

FIG. 9 is an example of how the coach may be applied to a network communication device, in particular a router, as discussed in FIG. 1. The collector control item 29*b* (FIG. 1) selection begins with a first screen view 40*b* for interfacing with the collector database, 14*a*, 14*b* (FIG. 1). In this example, continued in FIGS. 10–12, the user is trained how to perform the smurf detection task 42*b*, as shown in the list of steps 400.

The smurf detection task 42*b* has a list of steps 400, referred to as descriptors, including: "step 1" 402*a*, "step 2" 402*b*, "step 3" 402*c*, additional steps 402*d*, and "step n" 402*e*. In an alternate embodiment, the list of steps 400 includes non-generic names and/or indications for each step in the smurf detection task 42*b* list of steps 400.

In the example first screen view 40*b*, the first step requires the user to input information into an input box 52*a*. Accordingly, the "step 1" descriptor 402*a* is changed from a normal font style to a bold font style to indicate which step is being performed in the sequence. Additionally, as introduced in FIG. 2, a graphical overlay is placed over the main display area 50 to allow graphical indications to highlight—and explain where and what the GUI requires—each step of the task in sequence.

Shown in the graphical overlay over the main display area 50 is a highlighting box 410*a* around input box 52*a*, indicating to the user where an I/O device is to provide input. A line 410*b* connects the highlighting box 410*a* to an information box 410*c*, which contains a text description of what is expected to be entered into the input box 52*a*. In an alternate embodiment of the present invention, the information box 410*c* includes graphical indicators to explain what the input box 52*a* requires as input. In other embodiments, the information box 410*c* includes at least one of: recommended input, required input, example input, subsequence list, and a what-to-expect next descriptor.

In accordance with FIG. 7B, if the text mode is "off", the information box 410*c*, and included text, are not displayed to a user. Likewise, in accordance with FIG. 7A, a computer generated voice speaks the text in the information box 410*c* if the voice mode is "on", and is silent if the voice mode is "off". In the preferred embodiment of the present invention, until the user has completed "step 1" 402*a* in the task list 400, the first screen view 40*b* remains as shown, and the computer voice repeats the text in the information box 410*c*.

Figure 10:
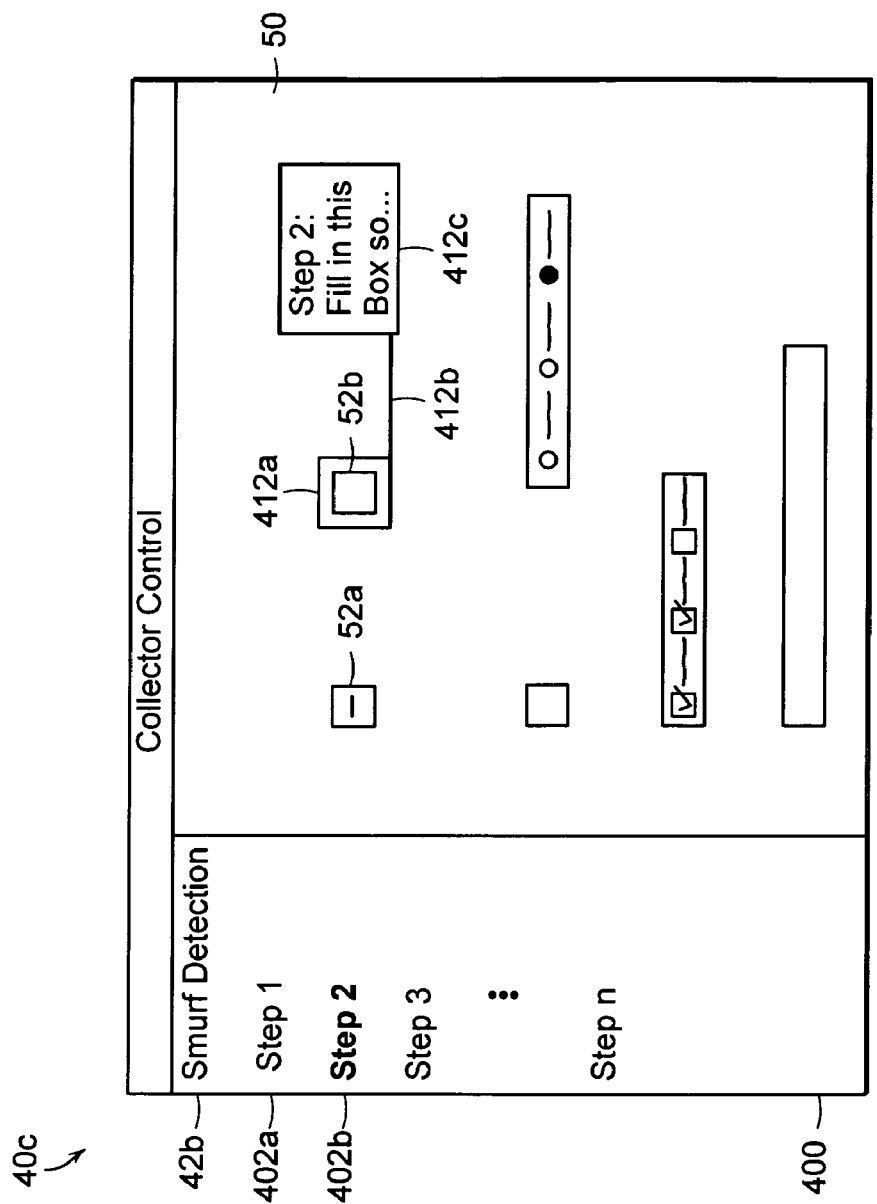
FIG. 10 is an example second screen view 40c following the first screen view 40b of FIG. 9 in the smurf detection task 42b sequence, selected from the task list 43 of FIG. 2.

FIG. 10 is a second screen view 40*c* for the smurf detection task 42*b*, following from FIG. 9. A "step 2" descriptor 402*b* in the list of steps 400 is changed from a normal font style to a bold font style to indicate to the user that this is the second step toward completing the smurf detection task 42*b*.

In the main display area 50, the input box 52*a* has an indication of a completed entry, resulting from completion of "step 1" 402*a* in the smurf detection task 42*b* list of steps 400. Also shown in the main display area 50 is a second input box 52*b* being surrounded by a highlighting box 412*a*, which is located in the transparent graphical overlay, as discussed in FIG. 2. The highlighting box 412*a* is connected to an information box 412*c* via a line 412*b*. The description box 412*c* has a description of the information with which the input box 52*b* is to be filled to properly complete "step 2" 402*b* in the smurf detection task 42*b*. In an alternate embodiment of the present invention, the information box 412*c* is filled with a graphical representation, and/or includes at least one of: recommended input, required input, example input, subsequence list, and a what-to-expect next descriptor. Furthermore, the voice mode being "on" results in the text or other description in the information box 412*c* being spoken to the user, as described in FIG. 9.

Figure 11:
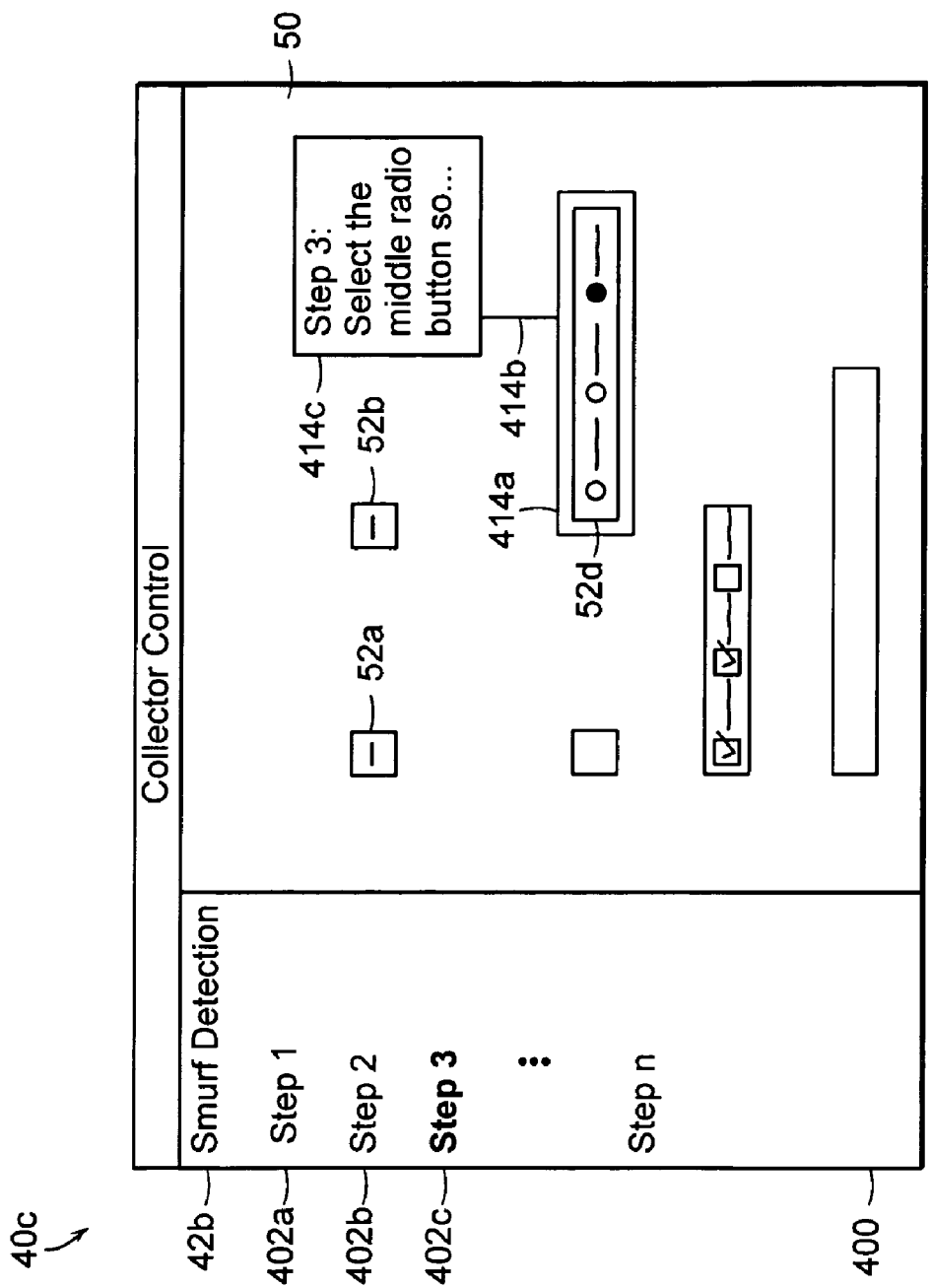
FIG. 11 is an example third screen view 40d following the second screen view 40c of FIG. 10 in the smurf detection task sequence 42b, selected from the task list 43 of FIG. 2.

FIG. 11 is a third screen view 40c in the smurf detection task 42b. The third screen view 40c indicates to the user what to do for "step 3" 402c in the smurf detection task 42b list of steps 400.

In the transparent graphical overview covering the main display area 50, a highlighting box 414a, surrounding the radio buttons box 52d, is connected to an information box 414c by a line 414b. The radio buttons box 52d is highlighted directly in the main display area 50 in an alternate embodiment of the present invention, rather than being highlighted by a highlighting box 414a in a graphical overlay. The information box 414c includes a textual description of what the operator is to do to complete "step 3" 402c. In preferred embodiment, as in FIGS. 9 and 10, if the voice mode is "on", the computer generates a voice that speaks the information in the information box 414c.

Because the coach is implemented as part of the GUI (i.e., third screen view 40c), previous actions taken by the user, in accordance with "step 1" 402a and "step 2" 402b, remain available for viewing by the user, which is part of the overall "coaching" principle. This is shown in that the first input box 52a and the second input box 52b remain in the main display area 50 with the information the user entered.

Figure 12:
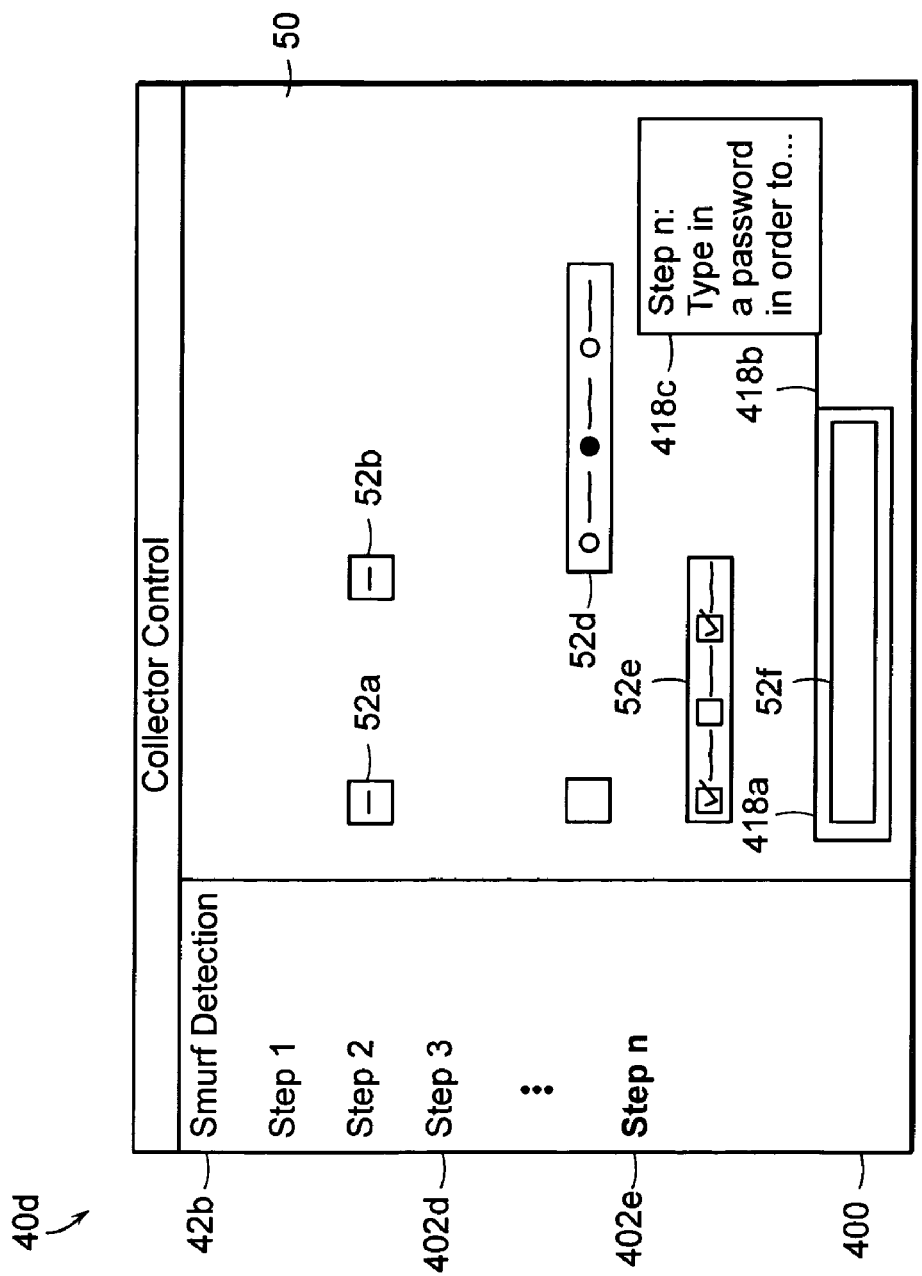
FIG. 12 is an example nth screen view 40e following an (n−1)th screen view in the smurf detection task sequence 42b, selected from the task list 43 of FIG. 2.

FIG. 12 is an "nth" screen view 40d in the smurf detection task 42b list 400. The main display area 50 indicates to a user that "step n" 402e, following a set of previous steps 402d, is being performed. The "step n" descriptor 402e is changed from a normal font style to a bold font style to further highlight to the user that "step n" 402e is awaiting completion.

In the main display area 50, input boxes 52a, 52b and radio boxes 52d, having their respective inputs, are viewable by the user. Note that check-boxes in input box 52e show indications of having been completed during step 402d, which is executed in a similar manner to steps 402a, 402b, and 402c, already described.

Also in the main display area 50 is the "step n" 402e set of indicators, specifically a highlighting box 418a, a description box 418c, and a line 418b connecting the two, 418a, 418c. The highlighting box 418a surrounds the input box 52f to inform the user that the input box 52f is awaiting input from the user (through use of an I/O device), as described by a description in the information box 418c. As in FIGS. 9–11, the information box 418c includes text and/or representations to indicate to the user what is expected to be input into the input box 52f. In other embodiments, the information box 418c includes at least one of: recommended input, required input, example input, subsequence list, and a what-to-expect next descriptor.

In accordance with the preferred embodiment, the text mode being "on" results in text being displayed in a graphical overlay over the main display area 50, as seen in the information box 418c. The voice mode being "on" results in the description in the information box 418c (via a text-to-speech synthesizer) to be audibly communicated to the user.

Figure 13A:
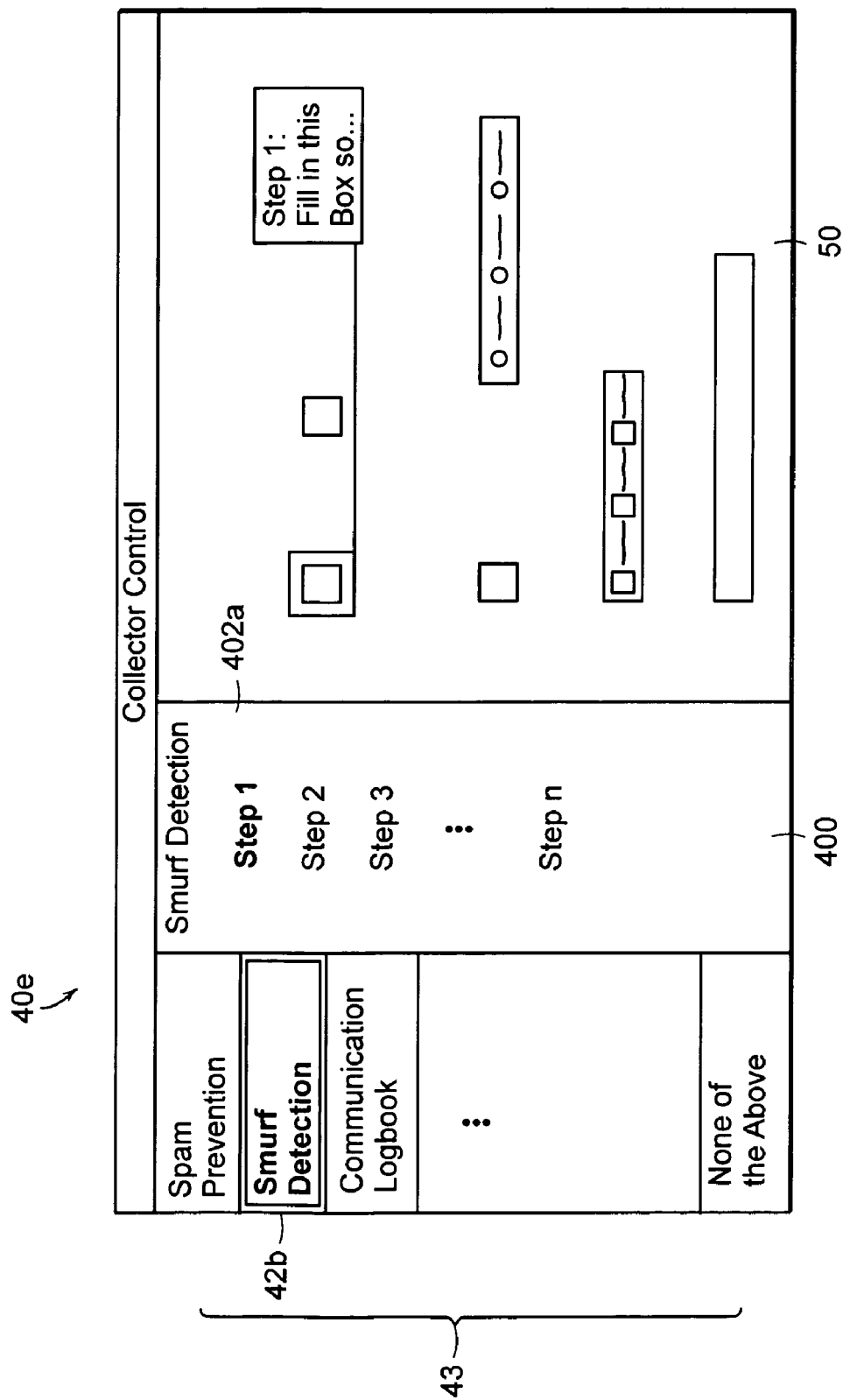
FIG. 13A is screen view of 40f having a task selection list 43 and a list of steps 400, thereby combining the lists of FIG. 2 and FIG. 9.

FIG. 13A is a screen view 40e having a so-called hierarchical structure. A task list 43 is displayed along with a smurf detection task indication 42b list of steps 400. In the main display area 50, instructions for "step 1" 402a direct a user's attention to performing the first step of the smurf detection 42b properly, as discussed in FIG. 9. Furthermore, the graphical area 42b displaying the smurf detection task indication 42b is highlighted, indicating that the smurf detection task 42b is presently selected by the user. This keeps the user's options for interfacing with the collector displayed while a specific task is being performed.

Figure 13B:
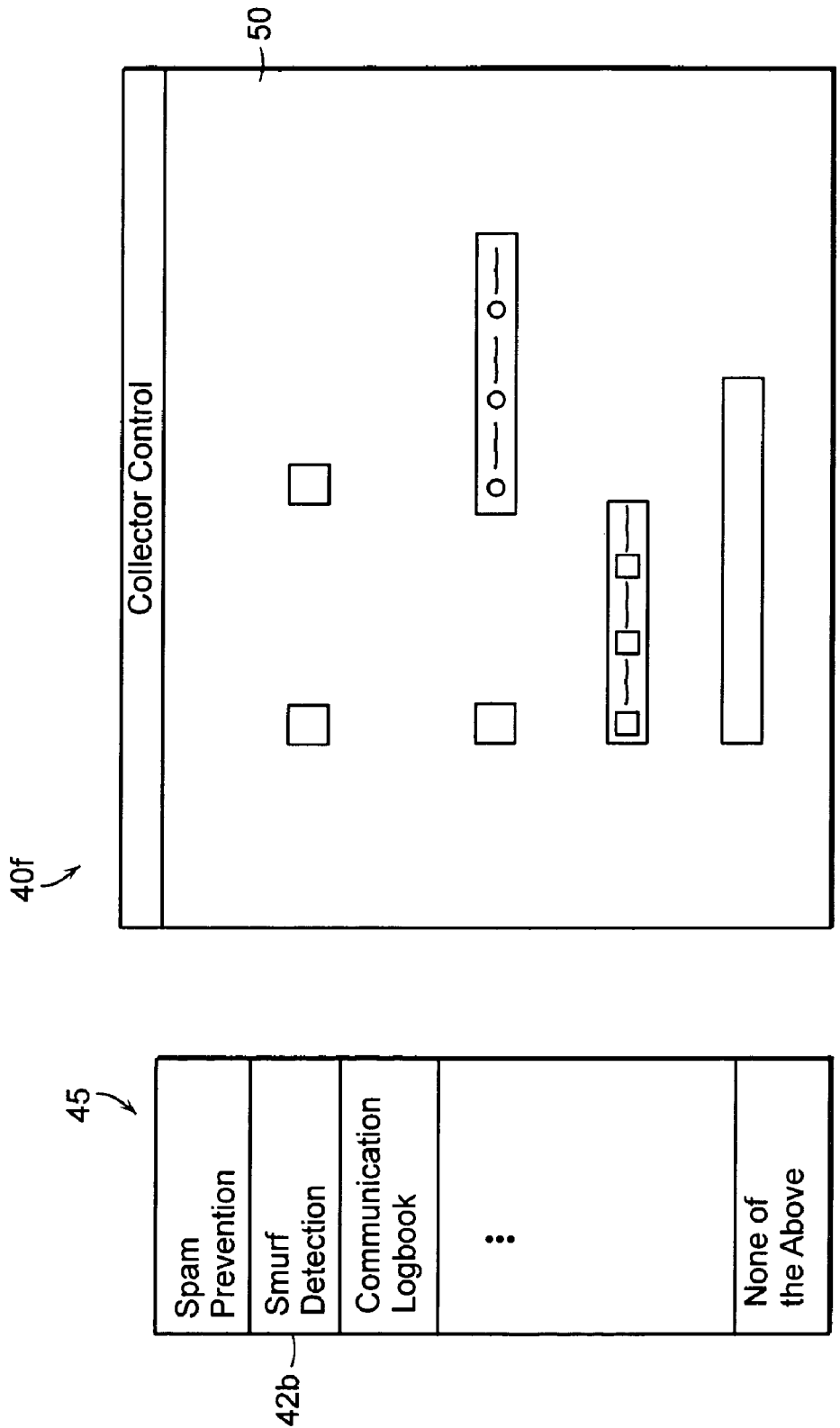
FIG. 13B is a screen view 40g having a tear-away task selection list 43 rather than being attached to the GUI window, as in FIG. 2.

FIG. 13B is a screen view 40f having a main display area 50 and a so-called "tear-away" task list 45. The tear-away task list 45 preferably changes to a list of task steps 400 (FIG. 9), upon selection a task, such as the smurf detection task 42b as discussed in FIG. 9. The advantage of having the tear-away task list 45 is to allow more main display area 50 than if the tear-away task list 45 were placed on the left edge of the main display area 50, as in FIGS. 9–12.

Figure 13C:
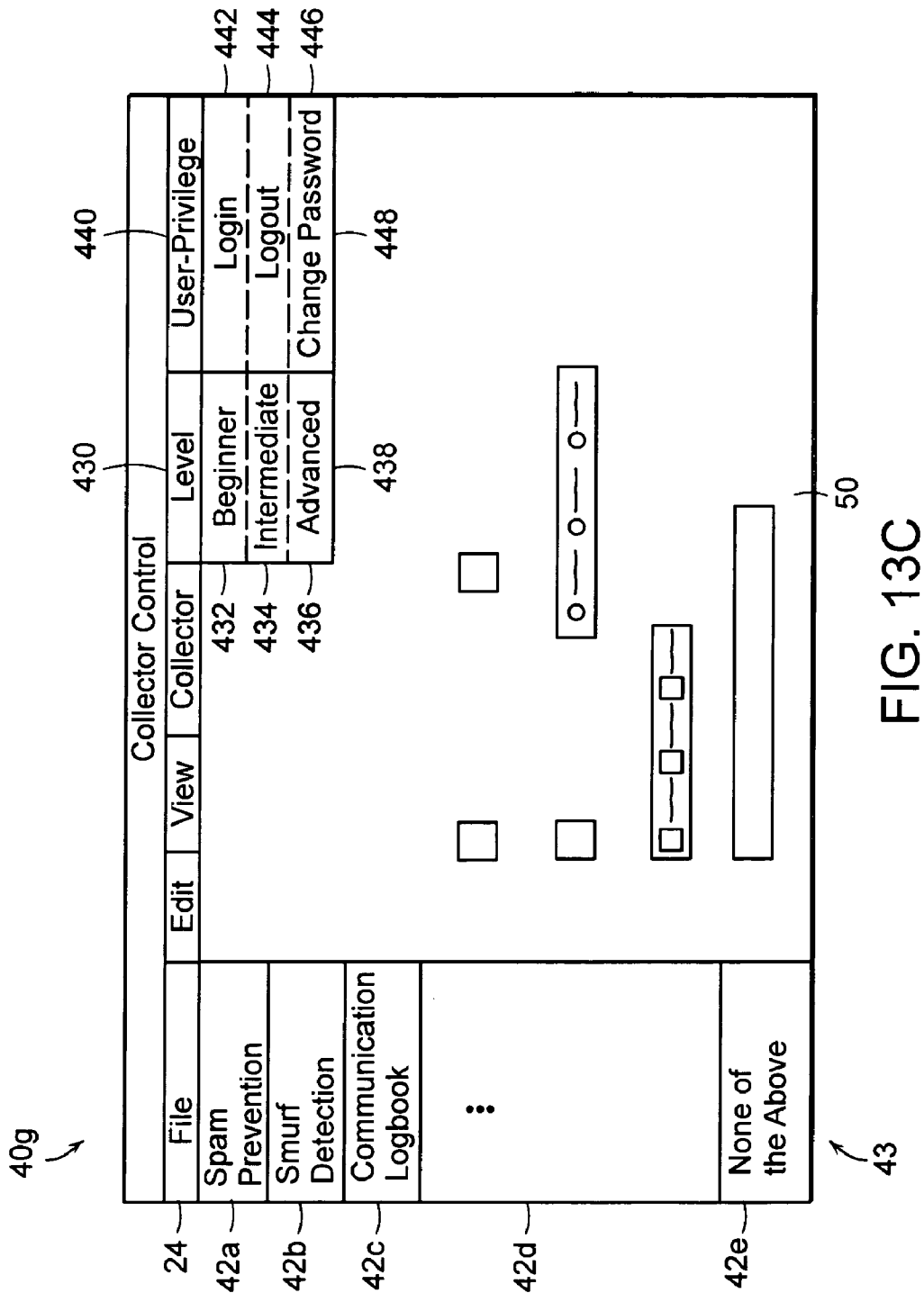
FIG. 13C is a screen view 40h having network-specific menu bar items in addition to the menu bar items discussed in FIG. 2.

FIG. 13C is a screen view 40g illustrating certain elements of the preferred embodiment. The menu item bar 24 (discussed in FIG. 2) includes a so-called "level" menu item 430 and a so-called "user-privilege" menu item 440. Each menu item 430, 440 includes a drop-down menu 438, 448, respectively.

The "level" menu item 430 includes a "beginner" indicator 432, an "intermediate" indicator 434, and an "advanced" indicator 436, collectively 438. The terms, beginner, intermediate, and advanced correspond to a level of "coaching" the user wishes to receive from the present invention. In one embodiment, for example, less detailed information is displayed in the information box 410c (FIG. 9) when the user selects the beginner level 432, whereas more detailed information is displayed in the information box 410c when the user selects the advanced level 436. Furthermore, in the beginner level 432, fewer task indicator buttons 42 are displayed in the task list 43 than for the advanced level 436.

The "user-privilege" menu item 440 includes a "login" indicator 442, a "logout" indicator 444, and a "change password" indicator 446, collectively 448. The terms login, logout, and change password pertain to the networking example specifically discussed in FIG. 1, and generally discussed throughout FIGS. 9–12. In the preferred embodiment, tasks displayed in the task list 43 are dependent upon the level of a user's privileges on the network. For example, a high-level network administrator is permitted to see every available task indicator button 42 in the task list 43, whereas a low-level network administrator is permitted to see a subset of task indicator button 42 in the task list 43, and a network user is permitted to see a very limited subset of task indicator button 42 in the task list 43.

Selection of the login indicator 442 enables a user to log into the network, which facilitates corresponding "GUI as coach" features. In the preferred embodiment, the features available are user specific. Selection of the logout indicator 444 disengages certain aspects of the coach and other aspects made available on a password-only basis. Selection of the change password indicator 446 is used to change the password, thereby restricting access to a subset of presumably) advanced features. Finally, as in the case of the task list 43, viewing certain areas of the main display area is restricted by level 430, user-privilege 440, and password.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. In a computer, an apparatus for providing software training and technical support to an end user, the apparatus comprising:

a graphical user interface having selectable graphical user areas adapted to support multiple different tasks, each task activated through a respective sequence of steps executed by a user through interaction with the selectable graphical user areas;

a graphical overlay positioned over said graphical user interface, the graphical overlay including (i) a first step indication associated with a first step in a given task directing the user's attention to a first selectable graphical user area to indicate to the user a first interaction with the graphical user interface the user is to perform to complete the first step and (ii) a next step indication associated with a next step in the given task automatically displayed upon the user's completion of the first step to indicate to the user a next interaction with the graphical user interface the user is to perform to complete the next step; and descriptors, corresponding to the steps and distinct from the graphical user areas, that are highlighted in a manner indicating which step is being performed.

2. The apparatus according to claim 1 further including a list of task indications selectable by the user, wherein the list of task indications dynamically changes as a function of the selectable graphical user areas being displayed in said graphical user interface.

3. The apparatus according to claim 1 further including a list of task indications selectable by the user, wherein the list of task indications is capable of being positioned apart from said graphical user interface.

4. The apparatus according to claim 1 further including a list of task indications selectable by the user, wherein the tasks represented in said list of task indications is a function of a mode setting, wherein a mode setting contains at least one setting including a beginner, an intermediate, and an advanced mode setting.

5. The apparatus according to claim 1 further including a list of task indications selectable by the user, wherein the tasks represented in said list of task indications are user-privilege specific.

6. The apparatus according to claim 5 wherein the user-privilege is consistent with the user-privilege in a data communication network.

7. The apparatus according to claim 1 further including a list of task indications selectable by the user, wherein the list of task indications are replaced by descriptors associated with a selected task indication in response to user selection.

8. The apparatus according to claim 1 wherein said graphical overlay is invisible other than the indications being displayed.

9. The apparatus according to claim 1 wherein the indications displayed include an information box including at least one of the following: recommended input, required input, example input, subsequence list, and a description of what to expect next.

10. The apparatus according to claim 1 further comprising recorded voice files or a text-to-speech synthesizer coupled to the step indications, wherein the step indications include at least one instruction simultaneously presented audibly.

11. The apparatus according to claim 1 further including a list of task indications selectable by the user, wherein selection of one or more selectable graphical areas in a sequence before selecting a task indication causes the apparatus to automatically highlight task indications corresponding to possible tasks being performed.

12. In a computer, a method for providing software technical support and training to an end user, the method comprising:

providing a graphical user interface having selectable graphical user areas adapted to support multiple different tasks, each task activated through a respective sequence of steps executed by a user through interaction with the selectable graphical user areas;

forming a graphical overlay positioned over said graphical user interface;

displaying a first step indication associated with a first step in a given task to direct the user's attention to a first selectable graphical user area to indicate to the user a first interaction with the graphical user interface the user is to perform to complete the first step;

upon the user's completion of the first step, automatically displaying a next step indication associated with a next step in the given task to direct the user's attention to a next selectable graphical user area to indicate to the user a next interaction with the graphical user interface the user is to perform to complete the next step; and highlighting descriptors, corresponding to the steps and distinct from the graphical user areas, in a manner indicating which step is being performed.

13. The method according to claim 12 further including displaying task indications, wherein displaying task indications includes dynamically changing the task indications as a function of the selectable graphical areas being displayed in said graphical user interface.

14. The method according to claim 12 further including displaying task indications, wherein displaying task indications includes presenting the task indications external from said graphical user interface.

15. The method according to claim 12 further including displaying task indications, wherein displaying task indications includes modifying the task indications as a function of a mode setting, wherein a mode setting contains at least one setting from a beginner, an intermediate, and an advanced mode setting.

16. The method according to claim 12 further including displaying task indications, wherein displaying the task indications includes modifying the task indications as a function of a user-privilege.

17. The method according to claim 16 wherein the user-privilege is consistent with the user-privilege in a data communication network.

18. The method according to claim 12 further including displaying task indications, wherein displaying task indications includes:

replacing the task indications with a plurality of descriptors associated with a selected task indication in response to user selection.

19. The method according to claim 12 wherein forming the graphical overlay includes configuring the graphical overlay to allow the selectable graphical user areas in the graphical user interface to be displayed without obstruction other than the step indication being displayed.

20. The method according to claim 12 wherein displaying the step indications includes displaying an information box, including at least one of the following: recommended input, required input, example input, subsequence list, and a description of what to expect next.

21. The method according to claim 12 further comprising converting the step indications to an audio output by means of recorded voice files or a text-to-speech synthesizer coupled to the step indications, wherein the step indication being displayed is simultaneously presented audibly.

22. The method according to claim 12 further including displaying task indications selectable by the user, wherein a user's selecting one or more selectable graphical areas in a sequence before selecting a task indication causes the method to further include automatically highlighting task indications corresponding to possible tasks being performed.

23. In a computer, an apparatus for providing software technical support and training to an end user, the apparatus comprising:
- means for providing a graphical user interface having selectable graphical user areas adapted to support multiple different tasks, each task activated through a respective sequence of steps executed by a user through interaction with the selectable graphical user areas;
- means for forming a graphical overlay positioned over said graphical user interface;
- means for displaying a first step indication in the graphical overlay, the first step indication associated with a first step in a given task directing the user's attention to a first selectable graphical user area to indicate to the user a first interaction with the graphical user interface the user is to perform to complete the first step;
- upon the user's completion of the first step, means for automatically displaying a next step indication associated with a next step in the given task in the graphical overlay to direct the user's attention to a next selectable graphical user area to indicate to the user a next interaction with the graphical user interface the user is to perform to complete the next step; and
- means for highlighting descriptors, corresponding to the steps and distinct from the graphical user areas, in a manner indicating which step is being performed.

24. A computer-readable medium having stored thereon sequences of instructions, the sequences of instructions, when executed by a digital processor, causing the processor to:
- provide a graphical user interface having a plurality of selectable graphical user areas adapted to support multiple different tasks, each task activated through a respective sequence of steps executed by a user through interaction with the selectable graphical user areas; and
- form a graphical overlay positioned over said graphical user interface;
- display a first step indication in the graphical overlay, the first step indication associated with a first step in a given task directing the user's attention to a first selectable graphical user area to indicate to the user a first interaction with the graphical user interface the user is to perform to complete the first step;
- upon the user's completion of the first step, automatically display a next step indication associated with a next step in the given task in the graphical overlay to direct the user's attention to a next selectable graphical user area to indicate to the user a next interaction with the graphical user interface the user is to perform to complete the next step; and
- descriptors, corresponding to the steps and distinct from the graphical user areas, that are highlighted in a manner indicating which step is being performed.

25. The computer-readable medium according to claim 24 wherein the sequence of instructions further causes the processor to display a list of task indications and to dynamically change the list of task indications as a function of the selectable graphical user areas being displayed in said graphical user interface.

26. The computer-readable medium according to claim 24 wherein the sequence of instructions further causes the processor display a list of task indications and to present the list of task indications external from said graphical user interface.

27. The computer-readable medium according to claim 24 wherein the sequence of instructions further causes the processor to display a list of task and to modify the list of task indications as a function of a mode setting, wherein the mode setting includes at least one of the following settings: beginner, intermediate, or advanced mode setting.

28. The computer-readable medium according to claim 24 wherein the sequence of instructions further causes the processor to display a list of task indications and to modify the list of task indications as a function of a user-privilege.

29. The computer-readable medium according to claim 28 wherein the user-privilege is consistent with the user-privilege in a data communications network.

30. The computer-readable medium according to claim 24 wherein the sequence of instructions further causes the processor to:
- display a list of task indications selectable by the user; and
- replace the list with a plurality of descriptors associated with a selected task indiction in response to user selection.

31. The computer-readable medium according to claim 24 wherein the sequence of instructions forming the graphical overlay configures the graphical overlay to be invisible other than the step indications being displayed.

32. The computer-readable medium according to claim 24 wherein the step indications being displayed include an information box, including at least one of the following: recommended input, required input, example input, subsequence list, and a description of what to expect next.

33. The computer-readable medium according to claim 24 further including a sequence of instructions to convert the step indications displayed to the end user to an audio output and to present the step indications audibly.

34. The computer-readable medium according to claim 24 wherein the sequence of instructions further causes the processor to display a list of task indications selectable by the user and to monitor a sequence of interactions by the end user with one or more selectable graphical user areas before automatically highlighting task indications corresponding to possible tasks being performed.

* * * * *